United States Patent [19]

Kinoshita et al.

[11] Patent Number: 4,610,210
[45] Date of Patent: Sep. 9, 1986

[54] SEWING MACHINE

[75] Inventors: Tomoaki Kinoshita, Kanagawa; Kunio Takano, Tokyo; Minoru Wada, Tokyo; Osamu Tachikawa, Tokyo; Hiroshi Tokunaga, Tokyo, all of Japan

[73] Assignee: Tokyo Juki Industrial Co., Ltd, Tokyo, Japan

[21] Appl. No.: 758,656

[22] Filed: Jul. 24, 1985

[30] Foreign Application Priority Data

Jul. 31, 1984 [JP] Japan ................. 59-160776

[51] Int. Cl.⁴ ............................................. D05B 21/00
[52] U.S. Cl. ................................ 112/121.12; 112/104; 112/262.3
[58] Field of Search ............. 112/121.12, 121.11, 112/456, 102, 103, 262.1, 262.3, 266.1, 104

[56] References Cited

U.S. PATENT DOCUMENTS 3,104,637  9/1963  Hedegaard ............... 112/104
3,111,920 11/1963  Hedegaard ............... 112/104
4,309,950  1/1982  Franklin ............... 112/121.12 X
4,388,884  6/1983  Hirota et al. ............ 112/121.12

Primary Examiner—Peter Nerbun
Attorney, Agent, or Firm—Yount & Tarolli

[57] ABSTRACT

A sewing machine having a work holder with a crank member in which a computing device is provided for computing coordinate values in accordance with the configuration of the work holder with the crank member and particularly, designed to convert coordinate values of a reference sewing pattern into coordinate values with the center of the crank member on the work holder with the crank member as the origin when the sewing pattern is enlarged or reduced in scale. When work holder with the crank member is returned to the sewing start point on the sewing pattern, the work holder with the crank member is returned in the direction of the X axis or Y axis depending upon the positional relationship between the existing position of the work holder with the crank member and a reference value.

11 Claims, 13 Drawing Figures

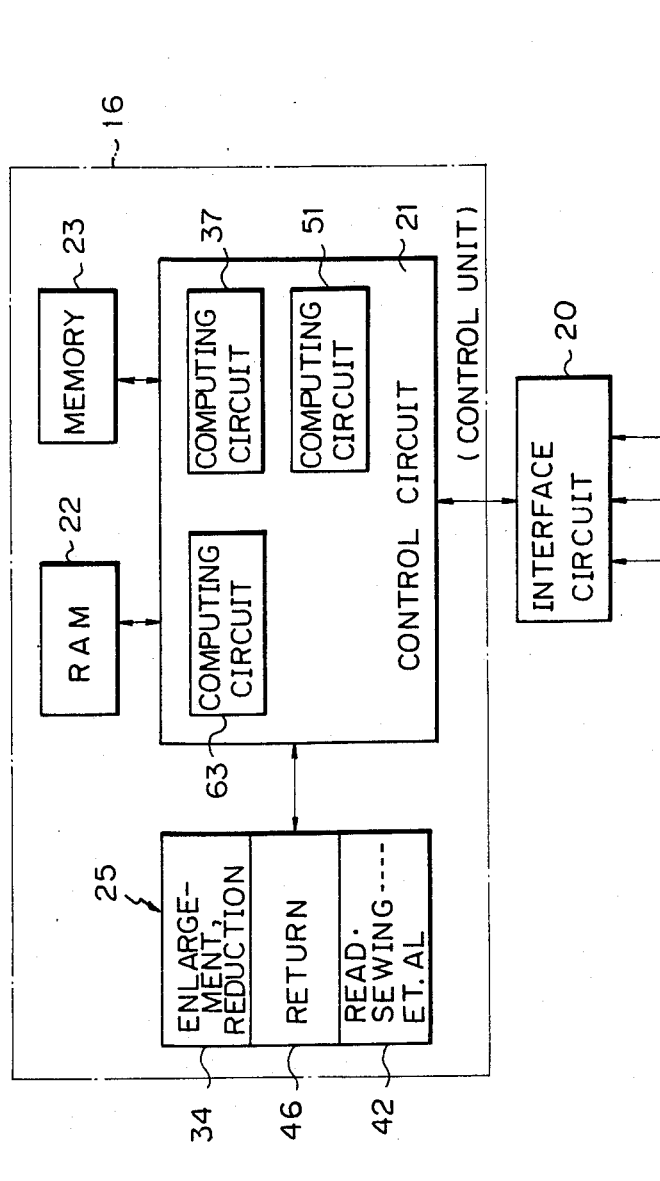

SEWING MACHINE

BACKGROUND OF THE INVENTION

This invention relates to program controlled automatic sewing machines and more particularly to sewing machines for use in sewing closed patterns of different sizes and having spaced apart start and termination points.

Hithertofore, it has been known sewing machines in which a memory medium, such as a magnetic card, magnetic tape or floppy disc stores a sewing pattern and a work holder is moved based on the information of the sewing pattern stored in the memory medium. In such a sewing machine, when a workpiece such as an appliqué or sticker is sewn onto the workpiece, a so-called work holder with a crank or force transmitting member is employed for moving the workpiece in a manner similar to that disclosed in U.S. Pat. No. 3,104,637.

FIG. 1 shows a sewing machine employing a conventional work holder with a crank or force transmitting member. That is, the work holder 1 is provided on the machine table in a position just below the needle 3 for movement in the directions of both the X and Y axes by pulse motors (not shown). In FIG. 1, reference numeral 5 denotes a turning mechanism. In the normal sewing operation of the sewing machine, as shown in FIG. 2, the turning mechanism 5 moves the work holder 1 which in turn moves the workpiece 6 in the directions of the X and Y axes in conformity with a predetermined sewing pattern. The turning mechanism 5 operates at a predetermined time point after the sewing operation has begun at the sewing start point A to turn a force transmitting or crank member 7 on the work holder 1 from the pattern starting position shown in solid lines in FIG. 2 to the pattern ending position shown in the one-dot and chain line in FIG. 2. When the workpiece 6 has been sewn to the sewing termination point B, the sewing operation on the workpiece completes.

When the crank or force transmitting member 7 is in the pattern starting position shown in solid lines in FIG. 2, the work holder 1 can be moved leftwardly to enable a pattern to be sewn from the start point A through the termination point B to the first inflection point or corner without interference between the crank 7 and needle 3. After the pattern has been sewn past the point B, the crank 7 is rotated from the pattern starting position shown in solid lines in FIG. 2 to the pattern ending position shown in one-dot chain lines in FIG. 2. The work holder 1 can then be moved to sew the pattern through the pattern start point A to the termination point B without interference between the crank 7 and needle 3. This results in the sewing of a closed pattern.

However, in the sewing machine employing the conventional work holder, if the sewing pattern 9 stored in the memory medium is employed in its enlarged scale as shown in FIG. 3, since the sewing pattern is enlarged with the coordinate origin as the center, the sewing start point A and the sewing termination point B on the enlarged sewing pattern 12 are not positioned corresponding to the crank member 7 on the work holder 1 with crank member 7 and thus, the sewing machine having the work holder with crank member has the drawback that the machine can not utilize the sewing pattern enlargement function.

And when the sewing machine having the work holder 1 with crank member 7 is operated employing the sewing pattern 9 stored in the memory medium in a reduced scale as shown in FIG. 4, since the sewing pattern is reduced in scale with the coordinate origin as the center, the sewing start point A and the sewing termination point B on the reduced sewing pattern 13 are not positioned corresponding to the reversion member 7 on work holder with reversion member 1, and thus, the sewing machine also has the drawback that the machine can not employ the reduced sewing pattern function.

And in the conventional sewing machine, in order to return the work holder to the sewing start point when a thread break occurs or abrupt stop in operation occurs due to any cause, the holder is returned along the shortest course between the existing point and return point. Therefore, when using the conventional work holder with crank member, the sewing machine has the drawback that the needle tends to contact the work holder with reversion member to be broken or bent thereby in the course of the returning of the holder to the sewing start point.

SUMMARY OF THE INVENTION

The present invention has the object to provide a sewing machine having a work holder with a force transmitting member and in which a stored sewing pattern can be enlarged or reduced in scale and contact between the force transmitting member and needle is prevented in the course of returning of the work holder to the sewing start point.

The sewing machine having the work holder with force transmitting member according to the present invention comprises a computing device for computing a coordinate value in accordance with the configuration of the work holder, an instructing device for giving an instruction to the computing device from outside and a control for controlling the computing device in response to the instruction from the instructing device. With the above-mentioned arrangement of the components of the sewing machine of the invention, the sewing operation can be performed using a sewing pattern in an enlarged or reduced scale and contact between the needle and work holder in the course of returning of the work holder to the sewing start point can be prevented.

According to the present invention, the sewing machine having a work holder with a force transmitting or crank member is provided with a computing device which computes a coordinate value in response to the configuration of the work holder whereby when the sewing pattern is enlarged or reduced in scale by the computing device the coordinate values of the inflection points on the sewing pattern are converted into coordinate values with the center of the force transmitting member as the origin to thereby enlarge or reduce the sewing pattern in scale and also prevent enlargement or reduction of the sewing pattern at both the sewing start and termination points. Thus, according to the present invention, the sewing pattern can be enlarged or reduced in scale so as to be sewn by the use of the work holder with a force transmitting or crank member. Furthermore, according to the present invention, the computing device is particularly designed to compute the amount of movement of the work holder in the X or Y axis in accordance with the positional relationship between the existing position and a reference value when the work holder returns to the sewing start point. Accordingly, when the work holder returns to the sewing start point contact between the work holder and needle can be prevented.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

DETAILED DESCRIPTION OF THE PREFERRED EMBODIMENTS

Figure 1:
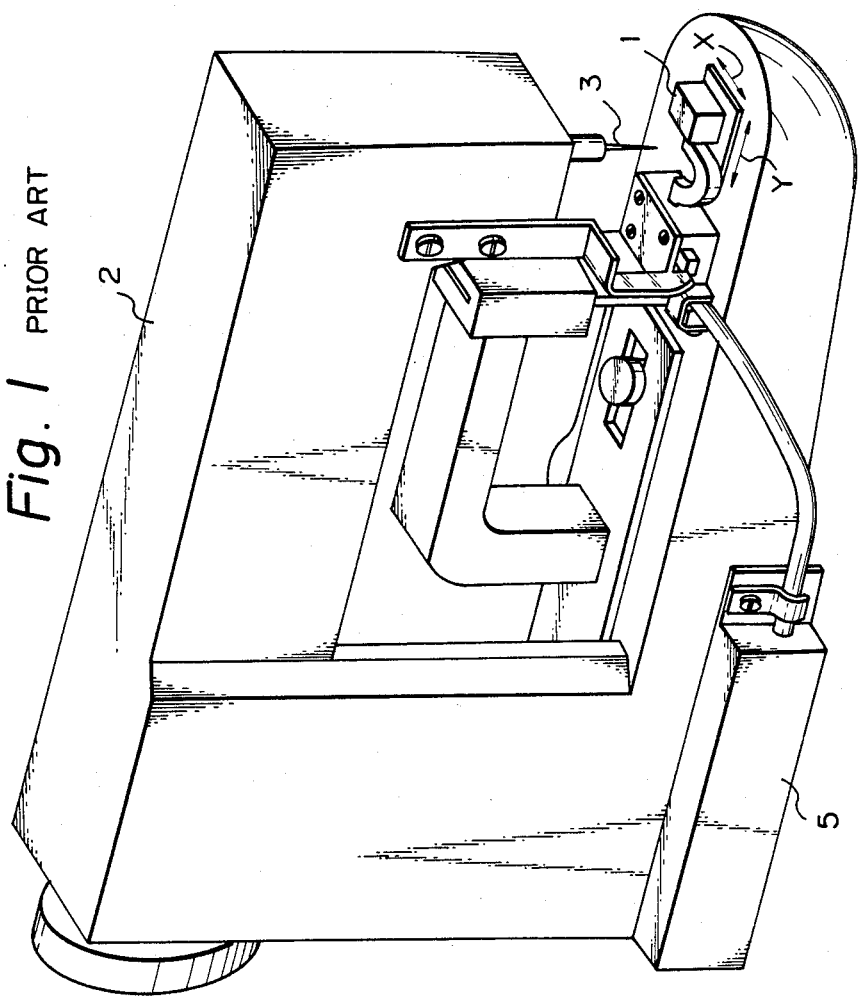
FIG. 1 is a perspective view of a sewing machine having a conventional work holder with a force transmitting or crank member.
Figure 2:
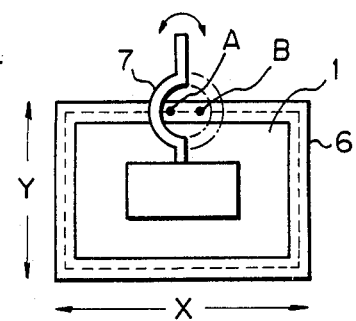
FIG. 2 is a plan view showing the sewing operation of the sewing machine by the employment of the conventional work holder with force transmitting member as shown in FIG. 1.
Figure 3:
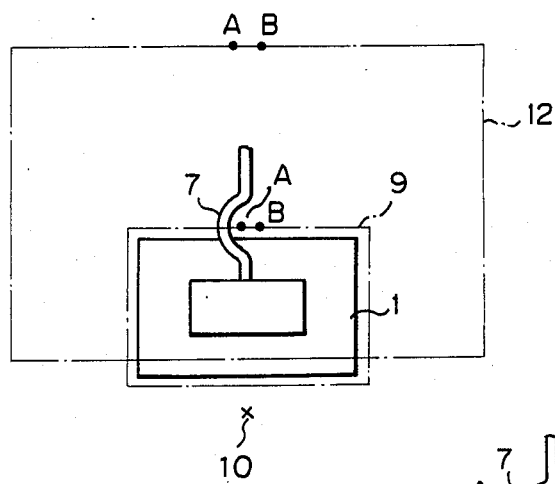
FIG. 3 is a plan view of an enlarged sewing pattern provided by the sewing machine employing the conventional work holder as shown in FIG. 1.
Figure 4:
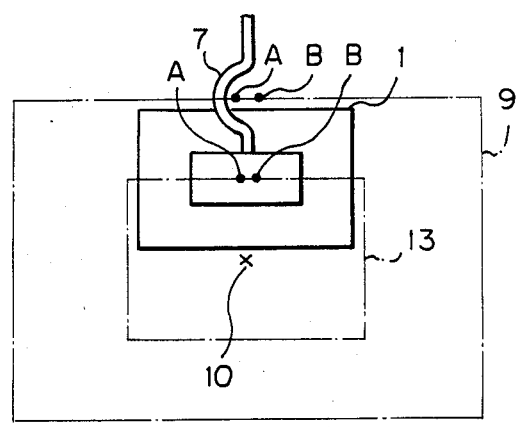
FIG. 4 is a plan view on a reduced scale of the sewing pattern provided by the sewing machine employing the conventional work holder as shown in FIG. 1.
Figure 5B:
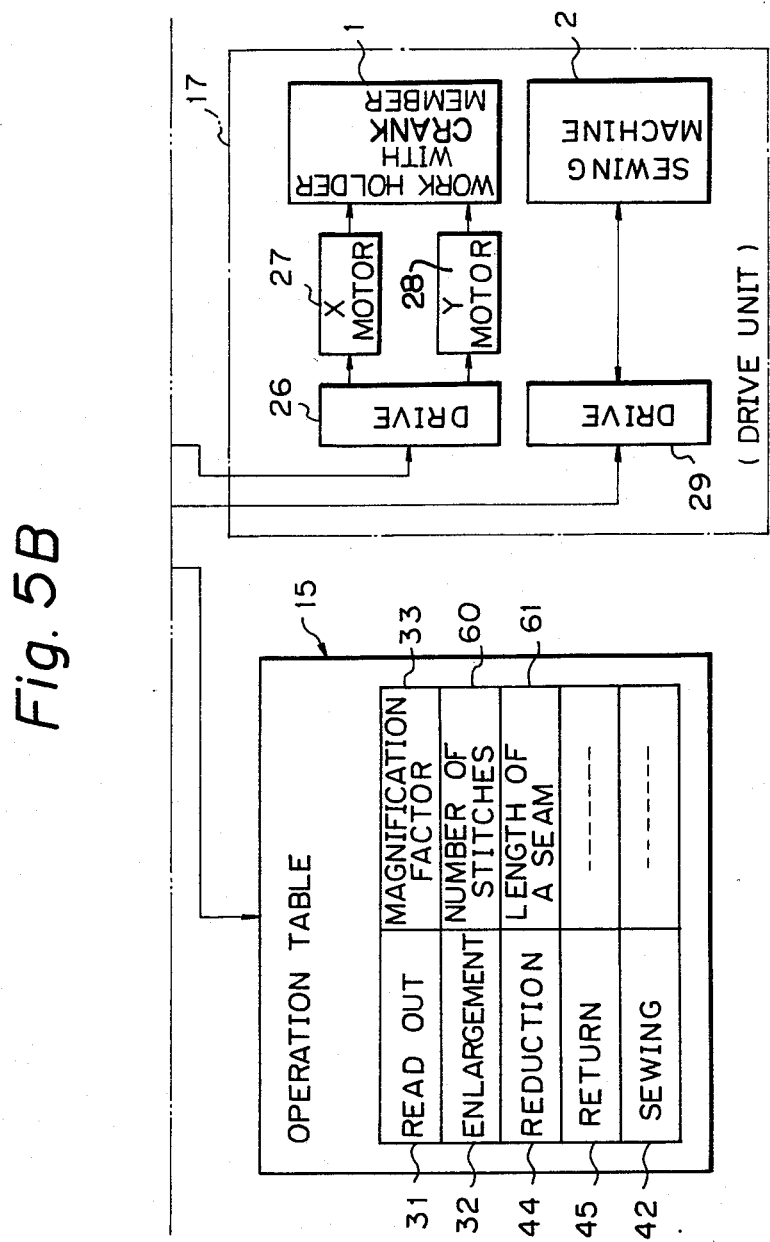
FIG. 5 is a fragmentary block diagram of one embodiment of the present invention.

One embodiment of the present invention will be now described referring to FIG. 5 which fragmentarily shows the embodiment of the present invention in a block diagram. FIG. 5 generally comprises an operation table 15, a control unit 16 and a drive unit 17. That is, the operation table 15 is connected through an interface circuit 20 to a control circuit 21. Also connected to the control circuit 21 is a RAM (Random Access Memory) wherein sewing patterns are to be stored. Also connected to the control circuit 21 are a write enable memory 23 and a read only memory circuit 25 wherein program sequences of various operations are to be stored. The memory circuits 23 and 25 are included within the control unit 16. And a work holder with force transmitting or crank member drive circuit 26 is also connected through the interface circuit 20 to the control unit 16 and the work holder drive circuit 26 is in turn connected to a pulse motor 27 adapted to move the force transmitting member 7 in the direction of X axis and a pulse motor 28 adapted to move the force transmitting member in the direction of Y axis, respectively whereby the outputs of these pulse motors are connected to the work holder 1. Furthermore, a sewing machine drive circuit 29 is connected to the control unit 16 with the output of the circuit 29 connected to the sewing machine 2.

Figure 6:
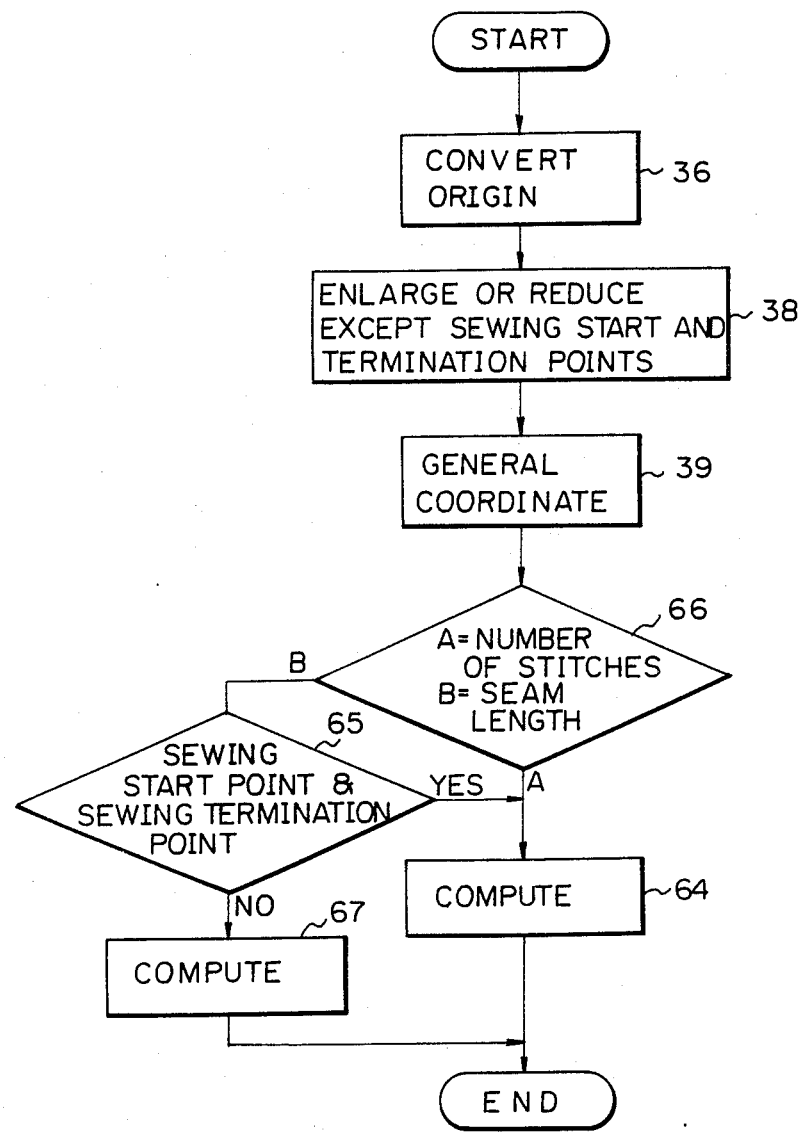
FIGS. 6 and 7 are flowcharts of enlarged and reduced scales sewing pattern modes, respectively, in the operation of said embodiment of the invention.
Figure 7:
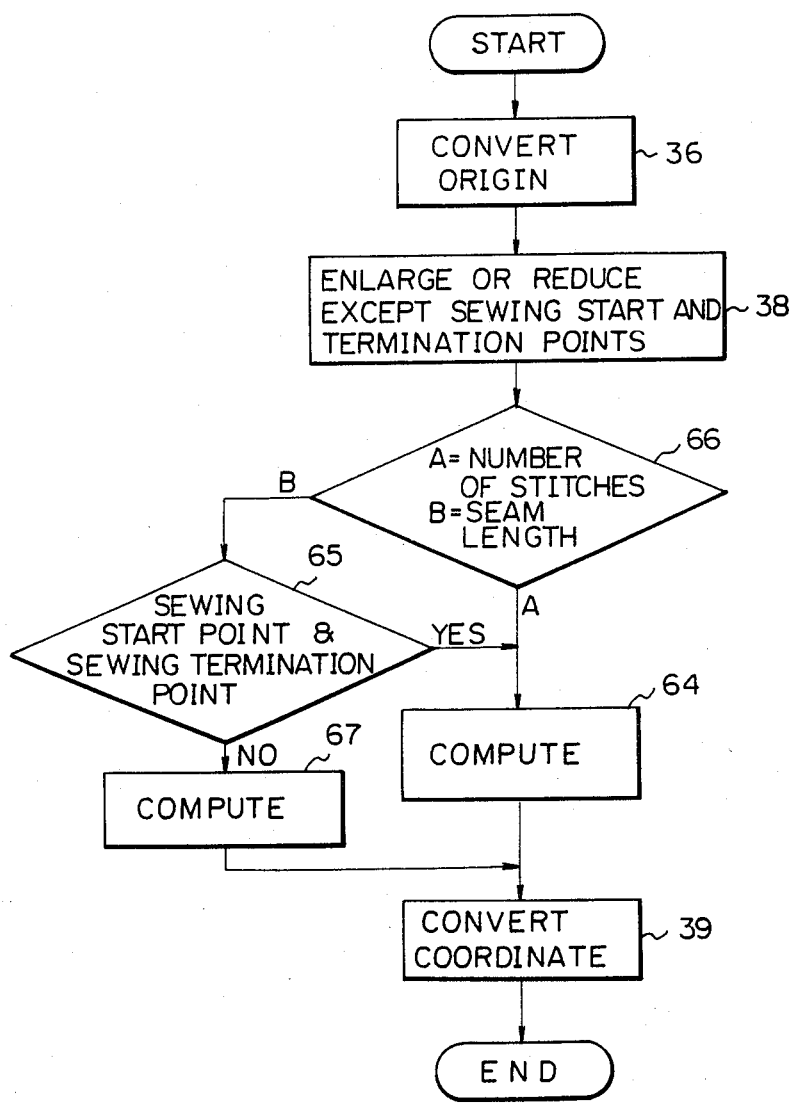

The operations for enlarging and reducing a sewing pattern in scale provided by the sewing machine having the principal components arranged as mentioned hereinabove will be now described. FIGS. 6 and 7 are flowcharts and FIGS. 8 and 9(a)-9(c) are views explaining enlarged and reduced sewing pattern modes, respectively. FIGS. 9(a)-9(c) describe Y axis in a horizontal direction. An instruction is input to the read key 31 on the operation table 15 to read a reference pattern 30 (FIG. 8) out of RAM 22 and the reference pattern is the basis which is enlarged and reduced in scale as described. When the reference sewing pattern 30 is desired to be enlarged in scale, an instruction is input to the enlargement key 32 on the operation table 15 and the magnification key 33 on the table 15 also inputs a magnification factor $\beta$ to the control circuit 21. And the number-of-stitches key 60 on the operation table 15 inputs an instruction which increases or reduces the number of stitches or the length of a seam to be formed to the control circuit 21. The control circuit 21 then selects the enlargement mode 34 from the memory circuit 25 and controls the following characteristic operations of the sewing machine in accordance with a predetermined program sequence.

Figure 8:
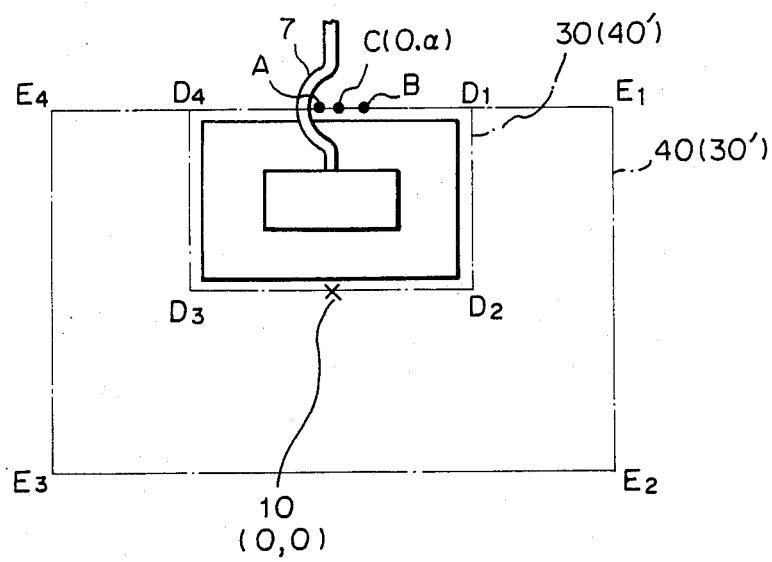
FIGS. 8 and 9(a)-9(c) are views of enlarged and reduced sewing pattern modes, respectively, in the operation of said embodiment of the invention.
Figure 9A:
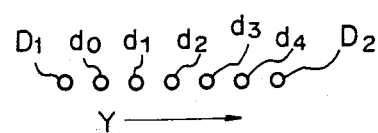
Figure 9B:
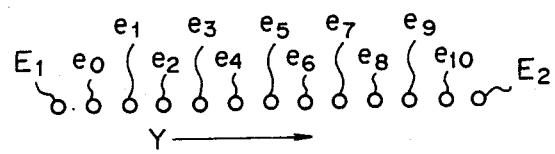
Figure 9C:
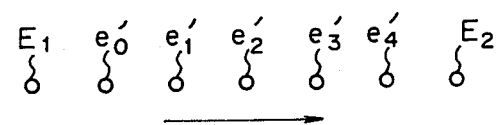

That is, the center of the enlarged pattern is positioned at the center C of the crank or force transmitting member 7 for the work holder 1 (FIG. 8). The coordinate value of the center C is stored with the coordinate origin 10 as the origin (O, O), accordingly it is (O, $\alpha$) in this instance (FIG. 8). At this state, since the coordinate values (X, Y) of the inflection points $D_1$, $D_2$, $D_3$ and $D_4$ on the reference sewing pattern 30 and the coordinates of the sewing start and termination points A and B are stored with the coordinate origin 10 as the origin, respectively, as shown in the block diagram of FIG. 6, the coordinate values of the inflection points on the reference sewing pattern 30 are converted into coordinate values with the enlargement origin C as the origin, respectively. That is, with respect to each of the Y coordinate values of the inflection points on the reference sewing pattern 30, the sewing start and termination points A and B, the operation $(Y-\alpha)$ is performed by the first computing circuit 37 included in the control circuit 21.

Next, as shown by the block 38 in FIG. 6, with respect to each of the converted coordinate values (X, $Y-\alpha$) of the inflection points $D_1$-$D_4$, the operation $X \cdot \beta$ and $(Y-\alpha) \cdot \beta$ is performed by the first computing circuit 37 so that the converted coordinate values are magnified by the input magnification scale factor $\beta$. At this time, the control circuit 21 determines the coordinate value representing the first sewing point on the reference pattern 30 as the sewing start point A and the coordinate value representing the last sewing point on the reference sewing pattern as the sewing termination point B, respectively and controls the computing circuit 37 to inhibit the computing circuit to perform magnifying operation for the points A and B.

Next, as shown by the block 39 in FIG. 6, a computation is performed whereby the coordinate values of the inflection points on the enlarged sewing pattern 40 are converted into the values of a sewing pattern with the coordinate origin 10 as the origin by which the work holder 1 is actually controlled. That is, with respect to the Y coordinate values $\beta(Y-\alpha)$ of the inflection points $D_1$-$D_4$ on the enlarged sewing pattern 40, the operation $\beta(Y-\alpha)+\alpha$ is performed by the computing circuit 37. In the illustrated embodiment, since the magnification factor $\beta$ is selected as two-fold, the inflection points on the reference sewing pattern 30 are enlarged to $E_1$-$E_4$, respectively as shown in FIG. 8.

It is to be noted that in the enlargement mode (and reduction mode) according to the present invention, the coordinate values of the sewing start and termination points A and B are the same as those of the reference sewing pattern 30 and not enlarged.

Next, the number of stitches or seam length is determined for increase or decrease mode (by the block 66 in FIG. 6). In case of increase in the number of stitches, since the length of the enlarged sewing pattern is that of the reference sewing pattern 30, the computing circuit 63 computes as follows (by the block 64 in FIG. 6). The operation of the computing circuit 63 will be described referring to FIGS. 9(a) and 9(b). When the distance between the inflection points $E_1$ and $E_2$ on the enlarged sewing pattern 40 (they are referred to merely as inflection points hereinbelow) is computed, for example, the number of stitches is computed by dividing the distance between the inflection points by the length of the reference sewing pattern 30. In this case, when the number of stitches is not an integer, the number of stitches is revised by counting fraction over $\frac{1}{2}$ as one and disregarding the rest in less than decimal part to thereby determine the number of stitches in the distance between the inflection points $E_1$ and $E_2$. The $E_1$-$E_2$ distance is divided by the revised number of stitches and the coordinate value of the point $e_0$ is then computed employing this seam length as the seam length to the next seam point $e_0$. Thereafter, the distance $e_0E_2$ between the sewing point $e_0$ and the inflection point $E_2$ is computed and the distance $e_0E_2$ is divided by the number of stitches which has been revised in the manner mentioned above with one stitch of the point $e_0$ substracted therefrom. The result is employed as the seam length to the next seam point $e_1$ to compute the coordinate value of the point $e_1$. The computation is repeated to compute the coordinate values of the inflection points $e_2$-$e_{10}$ and the coordinate value of the last inflection point $E_2$ is an enlarged coordinate value.

For the sewing start and termination points A and B, a similar computation is performed between the sewing start point A and inflection point $E_1$ and between the inflection point $E_4$ and sewing termination point B, respectively.

Other inflection points are similarly computed to automatically form an enlarged sewing pattern 40.

On the other hand, when an instruction for increasing or decreasing the seam length is input to the control circuit, the block 66 in FIG. 6 determines increase or decrease in the seam length.

An the control circuit 21 discerns whether the coordinate process range is between the sewing start point A and next inflection point $E_1$ or between the inflection point $E_4$ in front of the sewing termination point B and sewing termination point B or any other range (the block 65 in FIG. 6). If the range is discerned as being between the points A and $E_1$ or between the points $E_4$ and B, the computing circuit 63 computes increase or decrease in the number of stitches as shown by the block 64 with the sewing start point A and inflection point $E_1$ as the inflection points. Similarly, the computing circuit 63 computes increase or decrease in the number of stitches with the inflection point $E_4$ and sewing termination point B as the inflection points.

If the coordinate process range is out of the range between the points A and $E_1$ or between the points $E_4$ and B, increase or decrease in the seam length is computed. If the increase or decrease in the seam length is input to the control circuit as twice the seam length, since the enlarged sewing pattern has a length twice the seam length, the computing circuit 63 computes as follows (the block 67 in FIG. 6). The computation will be now described referring to FIGS. 9(a) and 9(c). In the same manner as described hereinabove, the coordinate values of the inflection points $E_1$ and $E_2$ are computed. At this state, in order to determine the sewing point $e_0'$, the relative coordinate values of the inflection point $D_1$ and next sewing point $d_0$ (the movement amount from point $D_1$ to inflection point $d_0$ or $\Delta X_1$ and $\Delta Y_1$) are doubled based on the above-mentioned seam length increase or decrease information. In FIGS. 9(a) and 9(c), the relative X coordinate value $\Delta X_1$ of the sewing point $d_0$ is zero and only the relative Y coordinate value $\Delta Y_1$ becomes $2\Delta Y_1$. The coordinate value of the next sewing point is $e_0'$ is computed based on the coordinate value $(0, 2\Delta Y_1)$ and the coordinate value of the inflection point $E_1$. Following this, the coordinate value of the next sewing point $e_1'$ is similarly computed based on the coordinate value of the sewing point $e_1'$ and the converted relative coordinate value $(0, 2\Delta Y_2)$. Also in this case, the coordinate value of the last point $E_2$ is an enlarged coordinate value.

The thus computed coordinate values of each of the inflection points on the enlarged sewing pattern 40 are stored in the memory circuit 23.

With the components maintained in this position, when the sewing key 42 on the operation table 15 is input an instruction thereto, the sewing mode 42 stored in the memory circuit 25 is selected and the drive unit 17 is controlled in accordance with the sewing mode program sequence so that the pulse motors 27 and 28 move the force transmitting or crank member 7 and the work holder 1 based on each of the inflection points on the enlarged sewing pattern to allow the sewing machine to perform a sewing operation similar to the normal sewing operation in conformity with the enlarged sewing pattern.

And also when the reference sewing pattern 30' as shown in FIG. 8 is reduced in scale, the same operation is performed. In this case, the reduction key 44 on the operation table 15 is input an instruction thereto to thereby select the reduction mode 34 and the scale coefficient key 33 on the operation table inputs a reduction scale factor $1/\beta$ to the control circuit. With the scale factor $1/\beta$, the operation as described hereinabove is performed whereby the coordinate values of the inflection points on the sewing pattern are obtained and the obtained coordinate values are stored in the memory circuit 23.

And when the sewing pattern provided by the work holder is enlarged or reduced in scale, the operation as shown in FIG. 7 may be performed. That is, the operation shown by the blocks 36 and 38 in FIG. 6 is performed to determine the enlarged inflection points $E_1$-$E_4$ as shown in FIG. 8 (the block 36 and 38 shown in FIG. 7). Next, a computation on the inflection points $E_1$-$E_4$ is performed in a similar way to that performed by the blocks 66, 65, 64 and 67 of FIG. 6 with the coordinate values having the C point as the origin (the blocks 66, 65, 64 and 67 shown in FIG. 7). Next, the coordinate data of the enlarged (or reduced) sewing pattern 40 (or 40') with the C point as the origin is performed in a manner similar to that performed by the block 39 of FIG. 6 to convert the sewing pattern into the coordinate value with the origin 10 as the origin.

Thus, in a sewing machine having the work holder, a sewing operation with an enlarged or reduced sewing pattern can be performed.

Figure 11:
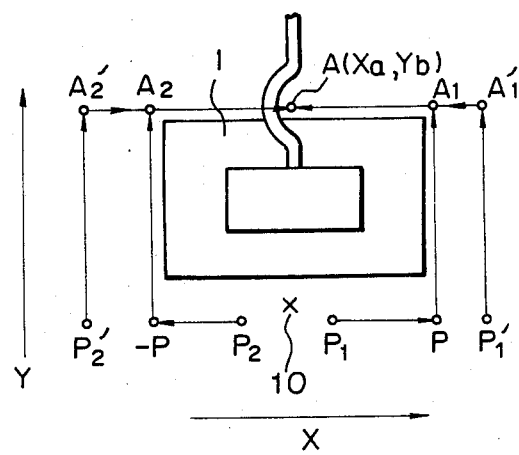
FIG. 11 is a flowchart explaining the returning to the sewing start point by said embodiment of the invention.
Figure 10:
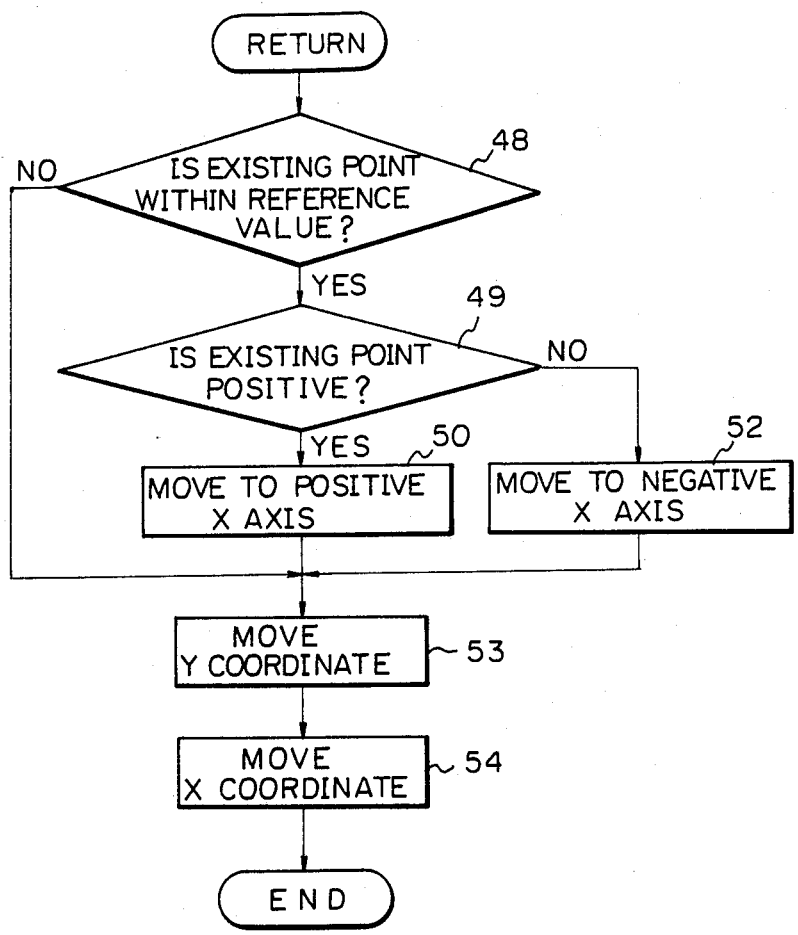
FIG. 10 is a flowchart showing the process of the returning to the sewing start point by said embodiment of the invention.

Next, the return operation to the sewing start point conducted on the sewing machine with the components as mentioned hereinabove will be now described. FIG. 10 shows the return operation in a flowchart and FIG. 11 is a view explaining the return operation. If and when the sewing operation interrupts due to an accidental stoppage caused by a thread break or any external cause, the return key 45 on the operation table 15 is input a signal thereto whereby the control circuit 21 selects the return mode 46 from the memory circuit 25 and controls the operation characterized as will be described hereinbelow in accordance with the program sequence.

That is, the control circuit 21 compares the existing coordinate value being constantly monitored with the return reference values $X=P$ and $X=-P$ (FIG. 11) stored corresponding to the configuration of the work holder with reversion member 1 as shown by the block 48 in FIG. 10. When it has been found that the existing point is within the return reference value P or $-P$ as shown at $P_1$ or $P_2$ of FIG. 11, it is determined whether the X coordinate value of the existing point $P_1$ or $P_2$ is positive or negative as shown by the block 49 of FIG. 10. In the case as shown in FIG. 11, the X coordinate value of the existing point $P_1$ is positive and as shown by the block 50 of FIG. 10, the second computing circuit 51 of the control circuit 21 computes the difference between the X coordinate value $X_1$ of $P_1$ and the return reference value P as shown by the block 50 in FIG. 10. The pulse motor 27 of the force transmitting member drive circuit 26 moves the work holder 1 by the difference in the direction in which the amount of difference is reduced or in the positive X axis direction of the coordinates with the coordinate origin 10 as the origin whereby the needle is positioned at point P of FIG. 11.

On the other hand, when the existing point is point $P_2$ as shown in FIG. 11, the X coordinate value of the existing point $P_2$ is negative and the second computing circuit 51 of the control circuit 21 computes the difference between the X coordinate value $-X_2$ of $P_2$ and the return reference value $-P$ as shown by the block 52 of FIG. 10. The pulse motor 27 of the force transmitting member drive circuit 26 then moves the work holder 1 by the difference in the direction in which the amount of difference is reduced or in the negative X axis direction whereby the needle is positioned at $-P$ point of FIG. 11. Next, the second computing circuit 51 in the control circuit 21 computes the difference between point P and the Y coordinate value $Y_b$ of the return point or sewing start point A as shown by the block 53. The pulse motor 28 of the force transmitting drive circuit 26 moves the work holder 1 by the difference in the direction in which the amount of the difference is reduced or in the positive X axis direction whereby the needle is positioned at point $A_1$ or $A_2$.

On the other hand, if and when the existing point is other than the return reference point value P or $-P$ as shown by $P_1'$ or $P_2'$ of FIG. 11, the control circuit 21 determines this as shown by the block 48 and the work holder 1 is moved to point $A_1'$ or $A_2'$ of FIG. 11 as described in connection with the block 53 hereinabove.

At this state, the second computing circuit 51 in the control circuit 21 computes the difference between the X coordinate value of point $A_1$ (or $A_1'$) or point $A_2$ (or $A_2'$) and the X coordinate value $X_A$ of the sewing start point A as shown by the block 54 of FIG. 10. The pulse motor 27 of the force transmitting member drive circuit 26 moves the work holder 1 by difference in the direction in which the amount of the difference is reduced. That is, in case of point $A_1$ (or $A_1'$), the work holder moves in the direction of the negative X axis and in the case of point $A_2$ (or point $A_2'$), the work holder moves in the direction of the positive X axis whereby the needle returns from the existing point $P_1$ or $P_1'$ or $P_2$ or $P_2'$ to the sewing start point A without contacting the work holder 1.

And in the foregoing, description has been made of the use of a plurality of computing circuits for different computing operations, it will be apparent that a single computing circuit can perform different computing operations.

Although the invention has been described in its preferred form with a certain degree of particularity, it is to be understood that the present disclosure of the preferred form has been changed in the details of construction and the combination and arrangement of parts may be restored to without departing from the spirit and the scope of the invention as hereinafter claimed.

What is claimed is:

1. A sewing machine for use in sewing closed patterns of different sizes and having spaced apart pattern start and termination points, said sewing machine comprising a workholder for moving a workpiece, force transmitting means connected with said workholder for moving the workholder, said force transmitting means being movable relative to said workholder between a pattern starting position in which said force transmitting means is offset to a first side of the space between the pattern start and termination points and a pattern ending position in which said force transmitting means is offset to a second side of the space between said pattern start and termination points, data storage means for storing data representative of a closed pattern having start and termination points which are spaced apart by a distance which is less than the distance through which the force transmitting means is movable, control means for controlling operation of said sewing machine to sew a closed pattern which corresponds to the pattern represented by the stored data and encloses an area which is larger or smaller than the area enclosed by the pattern represented by the stored data while maintaining the distance between start and termination points of the sewn pattern equal to the distance between the start and termination points of the pattern represented by the stored data, means for moving said force transmitting means between the pattern starting and ending positions during the sewing of patterns which are larger and smaller than the pattern represented by the stored data, said force transmitting means being disposed in the same position relative to the start and termination points of either a large or small pattern when said force transmitting means is in the pattern starting position, said force transmitting means being disposed in the same position relative to the start and termination points of either a large or small pattern when said force transmitting means is in the pattern ending position.

2. A sewing machine as set forth in claim 1 wherein said control means includes coodinate converting means for converting coordinate values of inflection points and of the sewing start and termination points in the pattern represented by the data stored in said data storage means into coordinate values having an origin in the same place relative to said force transmitting means for a large pattern and for a small pattern.

3. A sewing machine as set forth in claim 2, in which said control means further includes first means for magnifying said converted coordinate values except for those of said sewing start and termination points by a magnification scale factor, second means for converting said magnified coordinate values and said coordinate values of said sewing start and termination points into coordinate values with an origin of the magnified converted coordinate values at the same location as an origin read out from said data storage means.

4. A sewing machine as set forth in claim 3, in which said control means further includes third means for determining sewing points between said points converted by said second means as a desired seam length or number of stitches, and said control means further includes means for detecting said sewing start and termination points on the sewing pattern to prevent magnifying computation of the sewing start and termination points by said first means, and means for storing said coordinate values between said sewing start and termination points on the magnified sewing pattern provided by said third means.

5. The sewing machine as set forth in claim 2, in which said control means further includes first means for reducing the converted coordinate values except for those of said sewing start and termination points by a reduction scale factor, second means for converting the reduced coordinate values and said coordinate values of said sewing start and termination points into coordinate values with the origin of the reduced converted coordinate values at the same location as an origin read out from said data storage means.

6. A sewing machine as set forth in claim 5, in which said control means further includes third means for determining sewing points between said points converted by said second means as a desired seam length or number of stitches, and said control means further includes means for detecting said sewing start and termination points on the sewing pattern to prevent reducing computation of the sewing start and termination points by said first means, and means for storing coordinate values between said sewing start and termination points on the reduced sewing pattern provided by said third means.

7. The sewing machine as set forth in claim 2, in which said control means has means for instructing magnification of the scale factor of the sewing pattern represented by the data stored in said data storage means, said control means further including magnifying means for magnifying said converted coordinate values except for those of said sewing start and termination points by said magnification scale factor, coordinate value determining means for determining sewing points between said points magnified by said magnifying means as a desired seam length or number of stitches, and means for converting said coordinate values provided by said coordinate value determining means into coordinate values with the origin of said sewing pattern read out from said data storage means as the origin, means for detecting said sewing start and termination points on the sewing pattern to prevent magnifying computation of the sewing start and termination points by said magnifying means, and means for storing the magnified coordinate values of sewing points on said pattern.

8. The sewing machine as set forth in claim 2 in which said control means has means for instructing reduction of the scale factor of the sewing pattern represented by the data stored in said data storage means, said control means including reducing means for reducing the converted coordinate values except for those of said sewing start and termination points of said reduction scale factor, sewing point determining means for determining sewing points between said points reduced by said reducing means as a desired seam length or number of stitches, coordinate value converting means for converting said coordinate values provided by said sewing point determining means into coordinate values with the origin of said sewing pattern read out from said data storage means as the origin, and means for detecting said sewing start and termination points on the sewing pattern to prevent reducing computation of the sewing start and termination points by said reducing means, and means for storing the reduced coordinate values of sewing point on said sewing pattern.

9. A sewing machine a set forth in claim 1 wherein said force transmitting means includes a member having first and second end portions disposed on a central axis of said member and an intermediate portion which projects outwardly from the central axis of said member, said means for moving said force transmitting means between the pattern starting and ending portions including means for rotating said member about the central axis of said member.

10. A sewing machine comprising a memory device for storing sewing patterns for a workpiece as a coordinate value and a device for moving the workpiece in accordance with said sewing patterns read out from said memory device, said sewing machine being characterized by further comprising:

an instruction device for instructing said workpiece to return to a sewing start point on a sewn pattern;

a control device comprising first means for determining whether the existing position of said sewing pattern is within a reference coordinate value or not, second means for determining whether the X coordinate value of the existing position of the sewing pattern is positive or negative, third means for moving said workpiece in direction of the positive or negative of X axis based on the results of determination by said second means, fourth means for moving said workpiece in the direction of Y axis to a Y coordinate value of said sewing start point and fifth means for moving said workpiece to an X coordinate value of said sewing start point; and a computing device comprising sixth means for computing the difference between said reference value and an X coordinate value of the existing point during the operation of said third means to calculate the movement amount of said workpiece, seventh means for computing the difference between a Y coordinate value of said sewing start point during the operation of said fourth means to calculate the movement amount of said workpiece, and eighth means for computing the difference between said reference value and an X coordinate value of said sewing start point during the operation of said fifth means to calculate the movement amount of said workpiece.

11. A method of operating a sewing machine having a force transmitting member which moves a work holder and workpiece relative to a needle and which is movable relative to the work holder, said method comprising the steps of storing data representative of a reference pattern having spaced apart start and termination points disposed along a base seam, operating the sewing machine to sew a first pattern having a configuration corresponding to the configuration of the reference pattern, said step of operating the sewing machine to sew a first pattern includes moving the force transmitting member to move the work holder and a workpiece relative to the needle, sewing the first pattern with the base seam in a predetermined location relative to the force transmitting member, and, during sewing of the first pattern, moving the force transmitting member from a pattern starting position in which the force transmitting member extends across the base seam location and is offset to a first side of the first pattern start and termination points to a pattern ending position in which the force transmitting member extends across the base seam location and is offset to a second side of the first pattern start and termination points, said method further including the step of operating the sewing machine to sew a second pattern having a configuration corresponding to the configuration of the reference pattern and of a size which is different than the size of the first pattern, said step of operating the sewing machine to sew a second pattern includes moving the force transmitting member to move the work holder and a workpiece relative to the needle, sewing the second pattern with the base seam in the same predetermined location relative to the force transmitting member as in which the base seam of the first pattern was sewn, and, during sewing of the second pattern moving the force transmitting member from the pattern starting position in which the force transmitting member extends across the base seam location and is offset to the first side of the start and termination points of the second pattern to the pattern ending position in which the force transmitting member extends across the base seam location and is offset to the second side of the pattern start and termination points of the second pattern.

* * * * *